(No Model.) 7 Sheets—Sheet 2.

E. ORTMANN.
ENGINE.

No. 554,532. Patented Feb. 11, 1896.

Witnesses. Inventor.
Ernst Ortmann
By Benedict and Morsell
Attorneys.

(No Model.) 7 Sheets—Sheet 3.
E. ORTMANN.
ENGINE.

No. 554,532. Patented Feb. 11, 1896.

Witnesses.
O. H. Keney
Anna V. Faust.

Inventor.
Ernst Ortmann,
By Benedict & Morsell
Attorneys.

(No Model.) 7 Sheets—Sheet 5.

E. ORTMANN.
ENGINE.

No. 554,532. Patented Feb. 11, 1896.

Witnesses.

Inventor.
Ernst Ortmann,
By Benedict and Morsell
Attorneys.

(No Model.) 7 Sheets—Sheet 6.

E. ORTMANN.
ENGINE.

No. 554,532. Patented Feb. 11, 1896.

Witnesses.
O. H. Keeney
Anna O. Faust

Inventor.
Ernst Ortmann,
By Benedict and Morsell
Attorneys.

(No Model.) 7 Sheets—Sheet 7.

E. ORTMANN.
ENGINE.

No. 554,532. Patented Feb. 11, 1896.

Witnesses:
C. H. Keeney.
Anna V. Faust.

Inventor:
Ernst Ortmann,
By Benedict and Morsell,
Attorneys.

UNITED STATES PATENT OFFICE.

ERNST ORTMANN, OF MILWAUKEE, WISCONSIN, ASSIGNOR OF ONE-HALF TO GEORGE G. HENNEI, OF SAME PLACE.

ENGINE.

SPECIFICATION forming part of Letters Patent No. 554,532, dated February 11, 1896.

Application filed July 8, 1895. Serial No. 555,229. (No model.)

*To all whom it may concern:*

Be it known that I, ERNST ORTMANN, of Milwaukee, in the county of Milwaukee and State of Wisconsin, have invented a new and useful Improvement in Engines, of which the following is a description, reference being had to the accompanying drawings, which are a part of this specification.

My invention has relation to improvements in engines.

The primary object is to provide an improved form of engine of such construction that the ordinary longitudinally-reciprocating piston is replaced by an improved form of rotary piston, the engine being so constructed as to provide for an increased power with the consumption of the minimum quantity of fuel, together with the advantage of cheapness in construction.

With the above object and others in view the invention consists of the devices and parts or their equivalents, as hereinafter more fully set forth.

Figure 1:
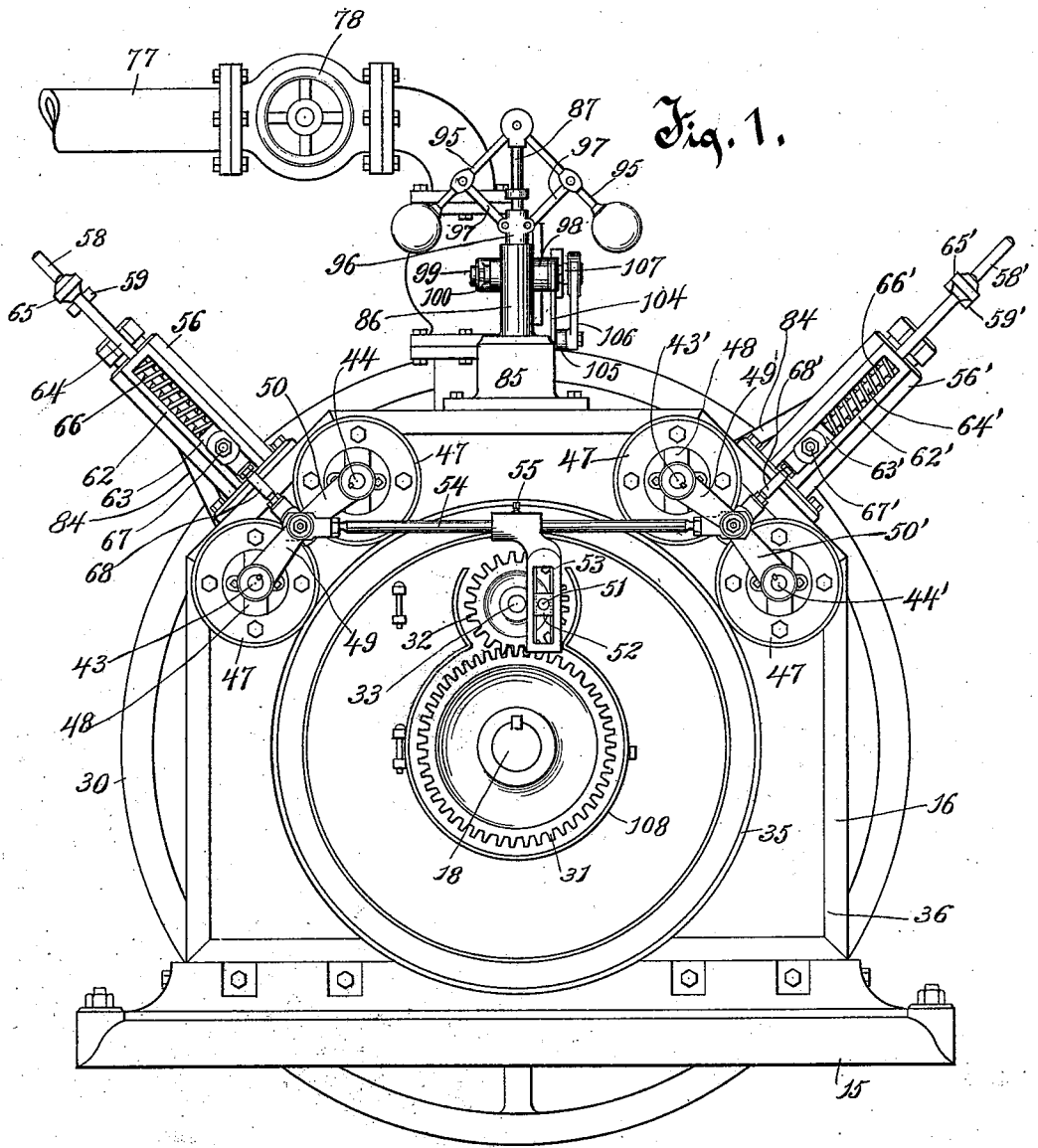
Figure 2:
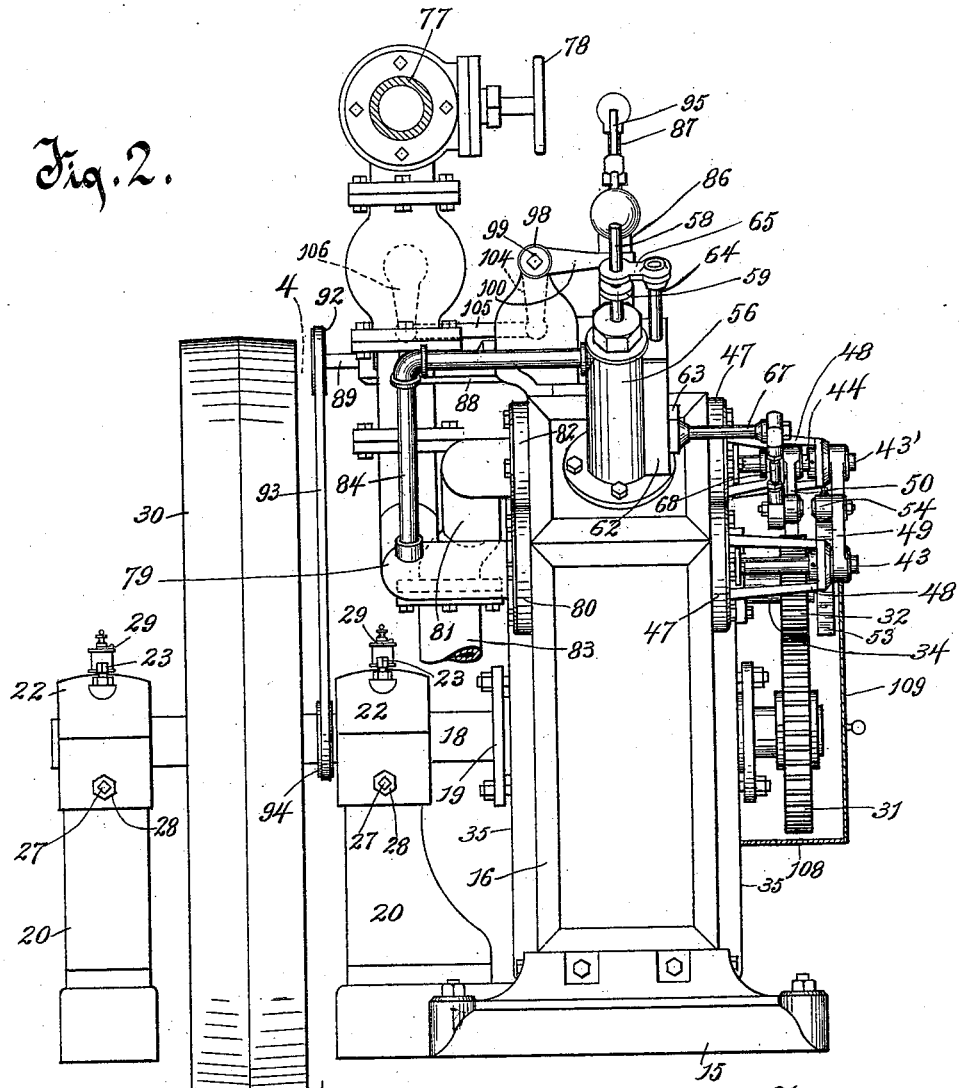
Figures 12, 13:
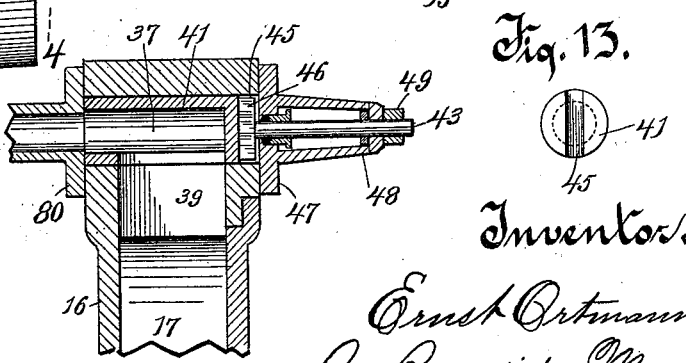
Figure 3:
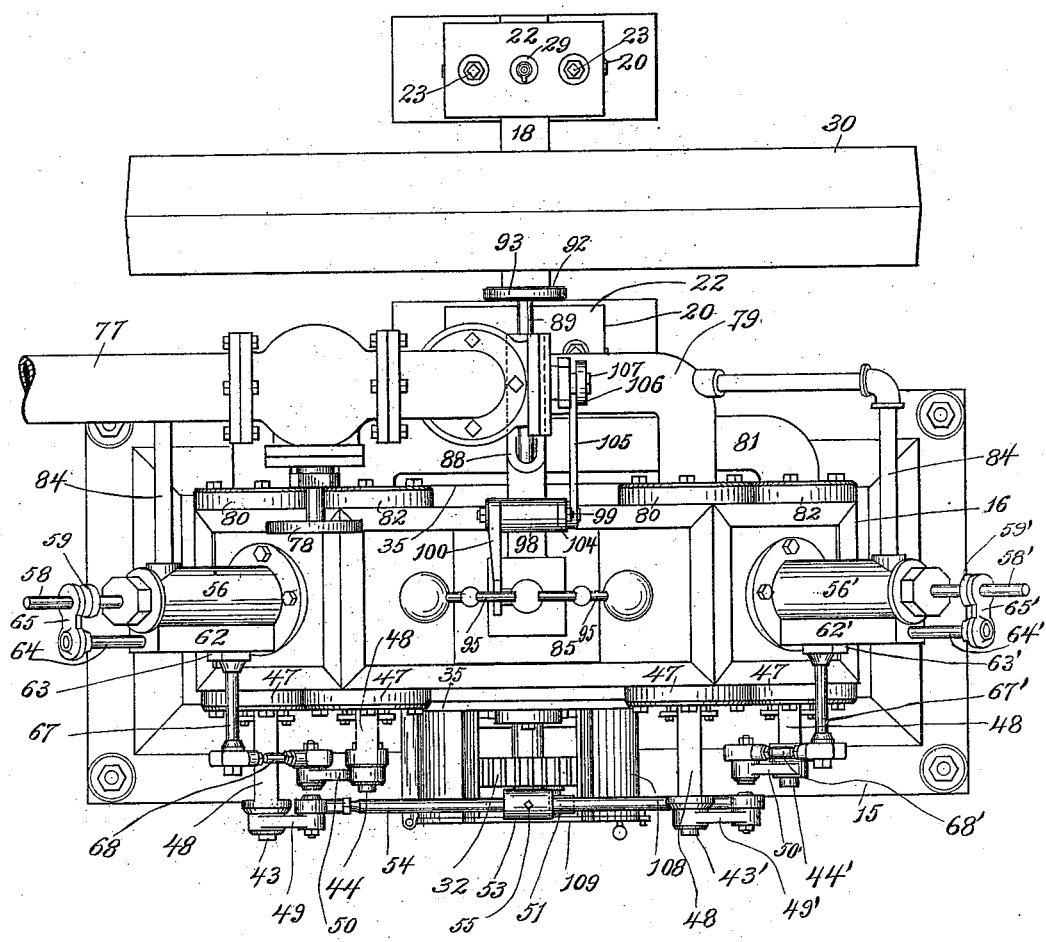
Figure 4:
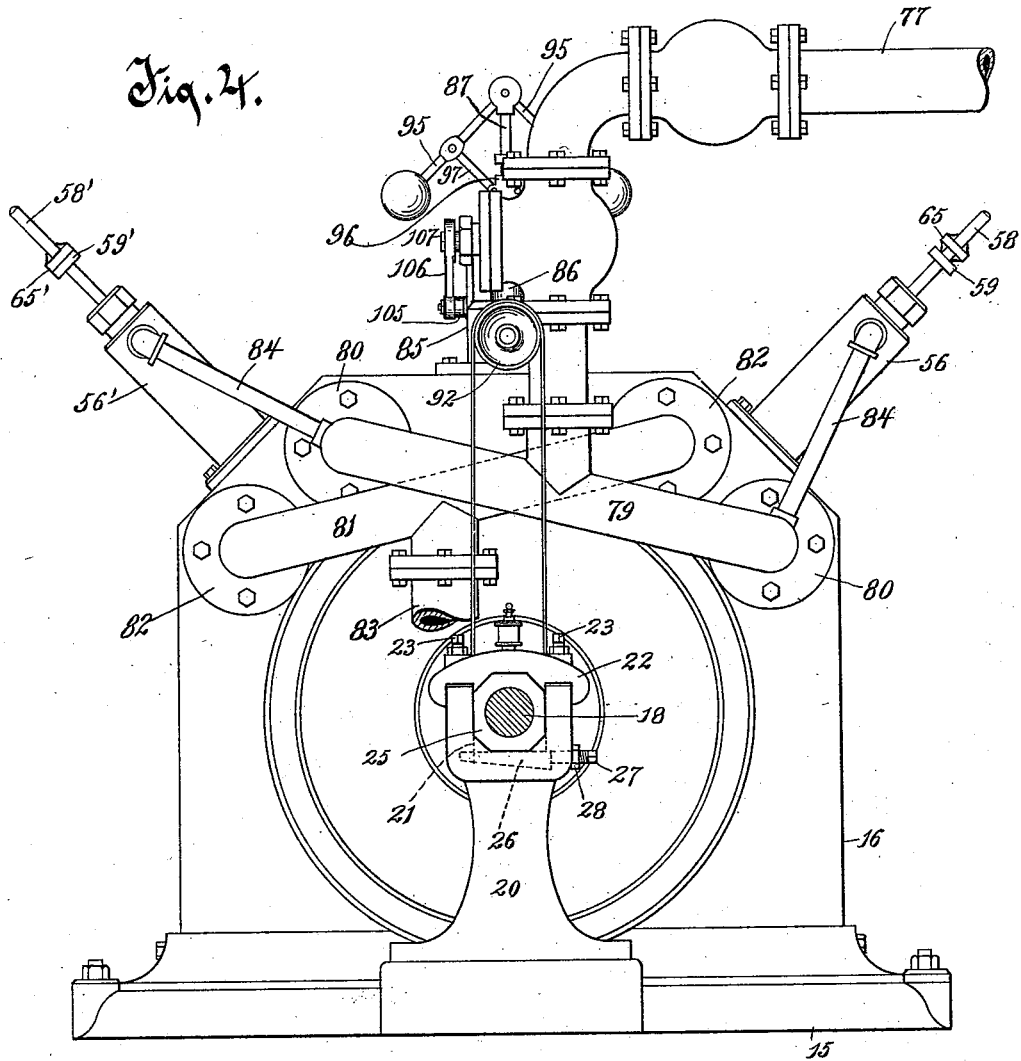
Figure 5:
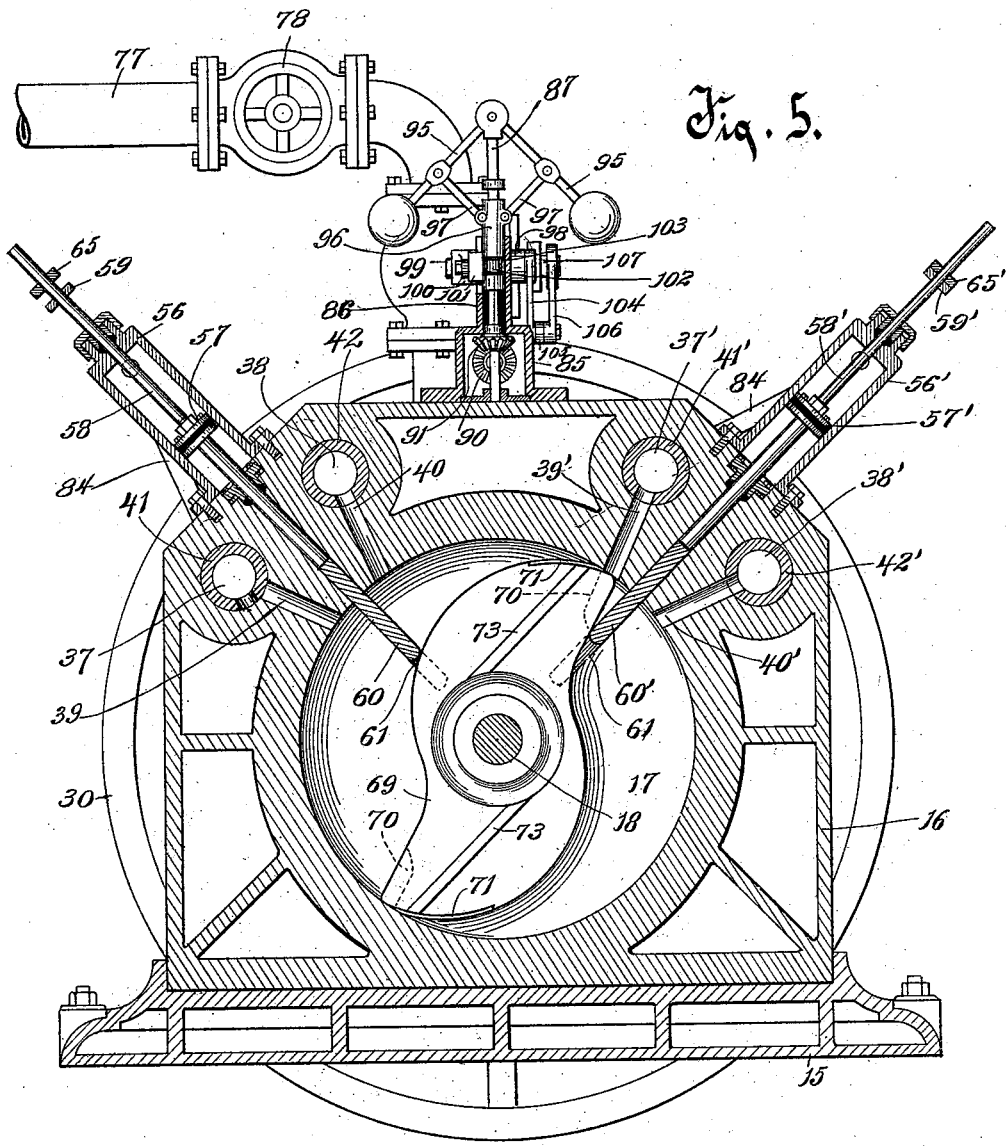
Figure 11:
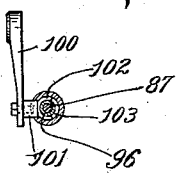
Figure 6:
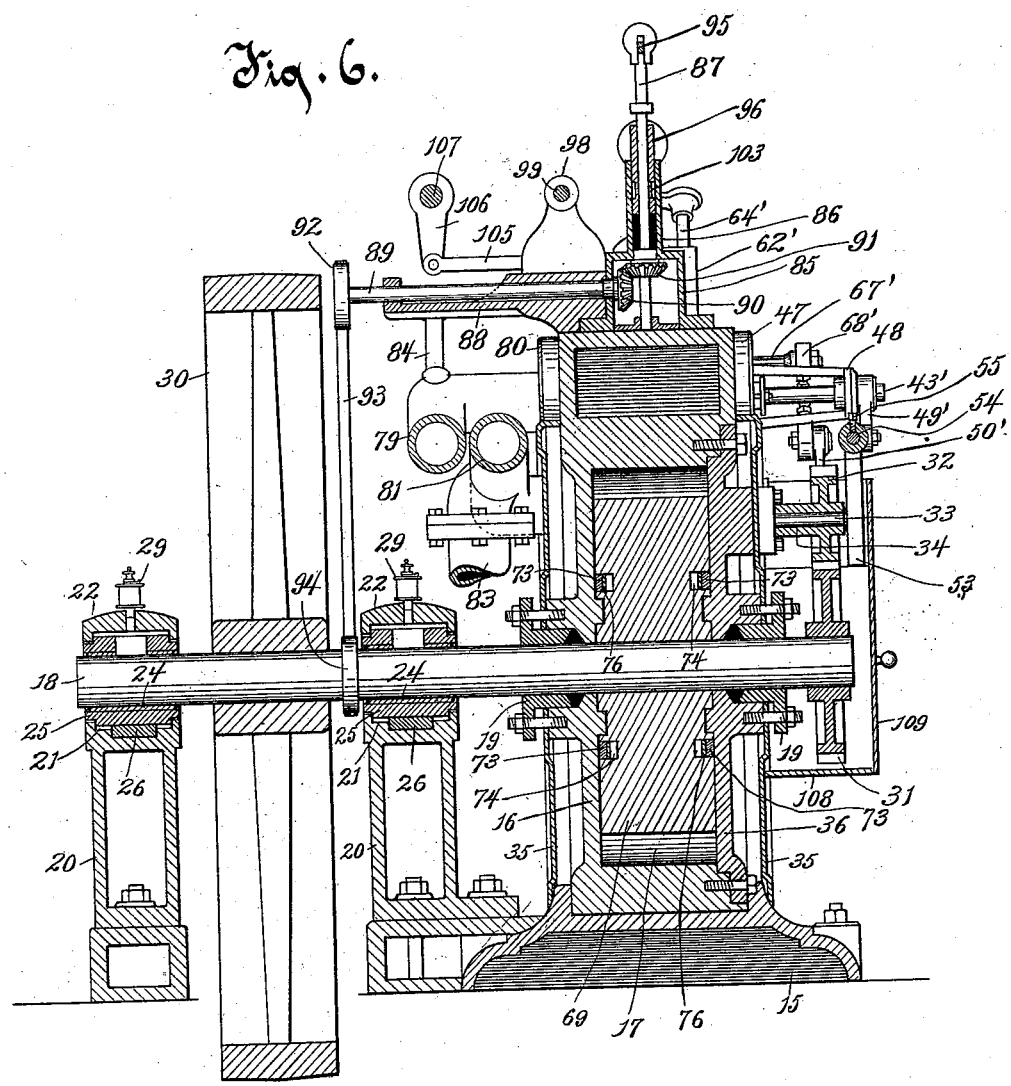
Figure 7:
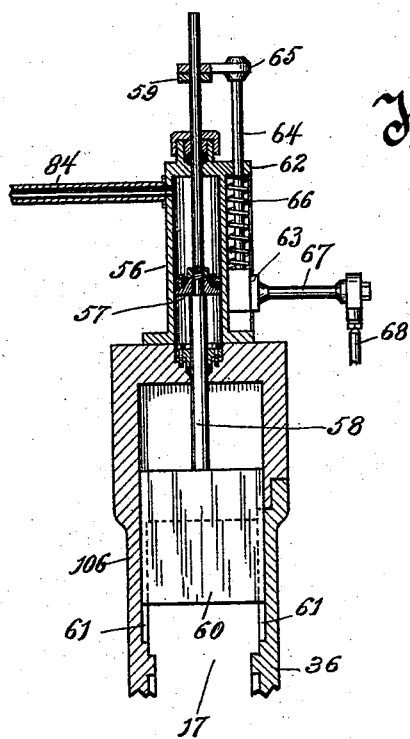
Figure 8:
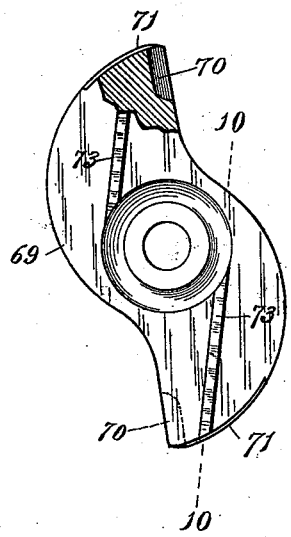
Figure 9:
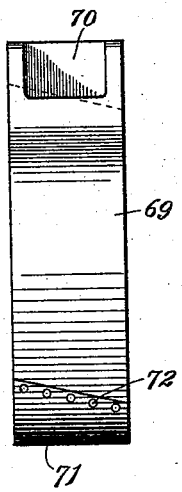
Figure 10:
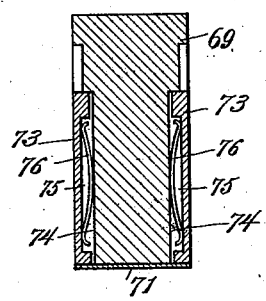

In the accompanying drawings, Figure 1 is an elevation of one side of the machine with the protecting-casing for the gearing removed. Fig. 2 is an end elevation. Fig. 3 is a plan view. Fig. 4 is a section on the line 4 4 of Fig. 2 with the protecting-casing for the gearing also in section. Fig. 5 is a central longitudinal vertical sectional view. Fig. 6 is a central transverse section. Fig. 7 is a section through one of the smaller steam-cylinders and through a portion of the main casing. Fig. 8 is a detail view of the central piston, part broken away. Fig. 9 is an edge view of Fig. 8. Fig. 10 is a cross-section on the line 10 10 of Fig. 8. Fig. 11 is a plan view of a detail of the governor mechanism. Fig. 12 is a section through one of the steam-ports and the valve therein. Fig. 13 is an end view of the valve shown in Fig. 12, and Fig. 14 is a face view of the door of the protecting-casing for the gearing.

Referring to the drawings, the numeral 15 indicates a supporting base-piece, which has mounted thereon a casing 16, provided with a central circular chamber 17. A shaft 18 passes through central openings in the casing, stuffing-boxes 19 19 being provided to render the openings practically steam-tight.

The shaft passes through standards 20 20 upon one side of the casing, being received in angularly-shaped recesses 21 21 in the upper ends of said standards. The tops of these recesses are closed by means of cap-pieces 22 22, said cap-pieces being made adjustable by means of screw-bolts 23 23, whereby the depths of the recesses may be increased or diminished. Next to the shaft within the recesses are washers 24 24, preferably of Babbitt metal, and surrounding these washers are angular collars 25 25, shaped to fit the recesses snugly. Passing beneath the angular collars are wedge-shaped keys 26 26. The angular collars 25 rest upon the upper straight edges of these keys. Screw-bolts 27 27 enter threaded openings in the standards and bear against the ends of the keys. Upon these bolts are nuts 28 28. When it is desired to elevate the collars, the caps 22 are raised the proper distance and the bolts 27 screwed inwardly and the nuts properly adjusted. In lowering the collars the bolts 27 are of course turned in the opposite direction.

The caps 22 22 are provided with oil-cups 29 29, from which the lubricant is fed through openings in the caps to the bearings of the shaft.

Upon the main shaft between the two standards is a fly-wheel 30. Upon the end of the shaft which projects beyond the opposite side of the casing is a gear-wheel 31, which meshes with a pinion 32 carried by a counter-shaft 33, the pinion being provided with a suitable bearing-hub 34 surrounding said counter-shaft.

In order to give the opposite sides of the casing a uniform and even appearance, outstanding plates 35 35 are secured thereto. One side, 36, of the casing is preferably removable in order to afford ready access to the interior.

At the upper portion of the casing, upon opposite sides and extending transversely of said casing, are sets of inlet and exhaust ports, the inlet-ports being indicated by the numerals 37 37' and the exhaust-ports by the numerals 38 38'. The inlet-ports are in communication with the central circular chamber 17 by means of branch ports 39 39' and the exhaust-ports by means of branch ports 40 40'.

Fitting snugly within the inlet-ports are tubular valves 41 41' and in the exhaust-ports similar valves 42 42', all of said valves being provided with suitable openings which are adapted to be brought into register with the branch ports. The inlet-valves are provided with valve-stems 43 43' and the exhaust-valves with stems 44 44'. The connection between the valve-stem and its valve is preferably made by providing in the end of the valve a recess 45, which receives an enlargement 46 at the end of the stem. Secured to one side of the casing are plates 47, which have projecting therefrom brackets 48. Through these several plates and brackets extending therefrom pass the valve-stems just referred to. To the outer ends of the inlet-valve stems 43 43' are connected crank-arms 49 49', while to the ends of the exhaust-valve stems are connected crank-arms 50 50'.

The pinion 32 hereinbefore referred to is provided with a crank or wrist pin 51, which carries at its end a block 52, said block working in a vertical slot of an arm 53. The upper end of this arm is sleeved to provide for the passage therethrough of an oscillating shaft 54, the sleeve portion being held rigid to the shaft by means of a set-screw 55. One end of the oscillating shaft is secured to crank-arm 49, while the opposite end of said shaft is secured to crank-arm 49'.

Extending upwardly from the casing are small steam-cylinders 56 56'. Working within these cylinders are pistons 57 57', said pistons being located at medial points of piston-rods 58 58'. The upper portions of the piston-rods pass through the upper ends of the steam-cylinders and have mounted thereon rigid collars 59 59'. The lower portions of the valve-stems pass through openings in the casing 16 and at their extremities carry flat cut-off plates 60 60', the edges of said plates working in suitable guide-slots 61.

Extending from the steam-cylinders are slotted boxes 62 62'. Working in the slots are blocks 63 63', and extending upwardly from the respective blocks are rods 64 64', which rods pass through the tops of the boxes, and carry at their upper ends arms 65 65', which arms are provided at their ends with openings, through which the upper ends of the piston-rods 58 58' pass freely. Encircling the rods 64 64', and confined between the blocks 63 63' and the tops of the boxes, are coiled springs 66 66', which springs normally hold the blocks down to the position shown in Fig. 1. Extending outwardly from the blocks are arms 67 67', and depending from these arms are links 68 68', which links connect respectively with the crank-arms 50 50'.

Mounted upon the main shaft 18, within the circular chamber 17, is a piston 69, of approximate sigmoidal shape. The opposite ends of this piston, as clearly shown in Fig. 5, bear against the circular edge of the chamber. At opposite longitudinal edges and at opposite ends the piston is provided with small recesses 70 70. The piston is also provided with end packings 71 71, which are of spring metal and fit within suitable recesses therefor in the piston. One end of each of these recesses is inclined and the packing correspondingly inclined, so as not to present a straight transverse edge to the end of the cut-off plate. Each packing is secured at its inclined edge within the recess by a series of rivets 72, while the opposite end of each packing is free. In Fig. 8 the free ends of these packings are shown as fitting snugly within their recesses, the same as if the ends of the piston were bearing against the circular edge of the chamber 17. The piston is furthermore provided with two sets of side packings, consisting of flat plates 73 fitting in suitable recesses 74 therefor in the piston. The backs of these plates are provided with recesses 75, and in the space between the walls of the same and the walls of the recesses of the piston are disposed bowed springs 76, the ends of which bear against the packing-plates and serve to force the same outwardly.

The numeral 77 indicates the main supply-pipe, provided with a suitable valve (not shown) operated by a hand-wheel 78 for controlling the inflow. The main supply-pipe communicates with a branch pipe 79 running obliquely of one side of the casing. The ends of this pipe are bent and terminate in annular flanges 80, which are secured to the side of the casing. These bent ends communicate with the ends of the inlet-ports 37 37', as clearly shown in Fig. 12.

The numeral 81 indicates another obliquely-arranged pipe, which constitutes the exhaust. This pipe is also provided with inwardly-bent ends, terminating in annular flanges 82, which are secured to the casing. These inwardly-bent ends communicate with the exhaust-ports 38 38'. Extending from the exhaust-pipe is a branch pipe 83 for conveying away the exhaust-steam.

Small branch pipes 84 84 lead from opposite ends of the oblique pipe 79 to the steam-cylinders 56 56' and serve for conducting live steam to said cylinders.

Mounted upon the top of the casing is a boxing 85, which boxing has projecting upwardly therefrom a tubular extension 86. Stepped in a bottom plate in the boxing is a governor-shaft 87, which shaft extends up through the upper end of the tubular extension. Mounted in a suitable bearing 88 is a horizontal shaft 89. One end of this shaft extends through the boxing and carries a beveled gear 90, which meshes with a corresponding gear 91 carried by the governor-shaft. The outer end of the horizontal shaft carries a pulley-wheel 92, around which passes an endless belt 93, which belt also passes around a pulley 94 on the main shaft 18. From the upper end of the governor-shaft extend the usual governor-ball arms 95 95. These arms are connected to a sliding sleeve 96 on the governor-shaft by means of links 97 97. Mounted in a suitable bearing 98 is a rock-shaft 99. To one end of this shaft is connected a crank-arm 100. The other end of the crank-arm is provided with a projection 101, which extends through an opening therefor in the tubular extension 86, the end of said projection terminating in a partly-circular lug 102, which lugs enter an annular groove 103 in the sliding sleeve. The opposite end of the rock-shaft 99 has connected thereto another crank-arm 104. To the lower end of this crank-arm in turn is connected a link 105, which link at its opposite end is connected to another crank 106, said crank being connected to a valve-stem 107, which operates a valve (not shown) within the main supply-pipe.

It is obvious that when the speed of the engine becomes too rapid the governor-balls will fly outwardly by centrifugal force and raise the sleeve 96. This sleeve will cause the crank-arm 100 to be operated, which, in turn, will cause the turning of the rock-shaft 99 and the actuation of the regulating-valve through the crank-arm 104, link 105 and crank 106 connected to the stem 107 of said regulating-valve.

In order to protect the gear-wheels 31 and 32, I prefer to provide a protecting-casing 108. This casing is provided with an opening which is normally closed by means of a hinged door 109, Fig. 14.

In the operation of my invention live steam is admitted to the inlet-ports 37 37' from the main supply. Now in the position of the parts shown in the drawings it will be seen, by reference to Fig. 5, that the opening of valve 41 is out of register with the branch port 39 leading to the central chamber 17, while the opening of valve 41' is in register with the branch port 39'. The openings of both the exhaust-valves 42 42' are in register with the branch ports 40 40'. The lower edges of the cut-off plates 60 60' are held against the edges of the piston 69 by steam-pressure against the upper faces of the pistons 57 57', the steam being let into the small cylinders 56 56' through the pipes 84. The live steam passing through the branch port 39' enters the lead recess 70 and causes a movement of the piston 69 and a consequent rotation of the main shaft 18, upon which said piston is mounted. The space between the cut-off plate 60' and the adjacent edge of the piston forms a closed steam-chamber, which is gradually enlarged as the piston continues to revolve. As the piston approaches the branch port 40, the end of cut-off plate 60 begins to ride up on the highest point of the edge of the piston. This causes this piston-stem 58 to be forced upwardly and the rigid collar 59 thereof to contact with the end of arm 65. This will have the effect of raising the rod 64 against the action of spring 66, and, through the block 63, arm 67 and link 68, operate the crank 50. This crank has the effect of turning the exhaust-valve 42 so as to bring its opening out of register with the branch port 40. The moment the end of piston 69 passes the cut-off plate 60 the end of said cut-off plate is forced down by the steam-pressure on piston 57 to bear against the opposite edge of piston 69. The piston-stem 58 is thereby lowered, which has the effect of bringing the collar 59 away from the arm 65 and permitting rod 64 to drop, whereby the opening of exhaust-valve 42 is again brought into register with the branch port 40, whereby the steam in the upper space between the cut-off plates 60 60' is permitted to escape. At this time the shaft 18 has been revolved sufficiently to cause, through the intermeshing gears 31 and 32, crank-pin 51, block 52, and vertically-slotted arm 53, an actuation of the oscillating shaft 54 in a direction to the right of Fig. 1. This will cause a pull to be exerted on crank-arm 49 and a push on crank-arm 49', whereby the opening in valve 41 is brought into register with the branch port 39 and the opening in valve 41' out of register with branch port 39'. Live steam will now be admitted through branch port 39 and will fill the space between cut-off plate 60 and the adjacent edge of the piston, causing the continued rotation of said piston. At this time, also, the steam is being exhausted from the space between the two cut-off plates through the branch port 40. It will, of course, be understood that the raising and lowering of the cut-off plates are caused by the rotation of the piston 69 and the fact that the ends of said cut-off plates are acted upon by the peculiarly-shaped cam edges of said piston. As the piston continues to rotate from the position last referred to, the chamber filled by the live steam is of course continually enlarged. At the time the end which is lowermost in Fig. 5 reaches a position near to the branch port 40' the cut-off plate 60' will bear against the highest point of the edge of the piston, and this will have the effect of raising said plate and with it the piston-stem 58' and its piston 57'. The rigid collar 59' will thereby be brought against the arm 65' and cause the uplifting of the rod 64, which, through the block 63', projecting arm 67' and link 68', will cause the turning of the crank-arm 50', which crank-arm will turn the valve 42', so as to cut off the exhaust. The moment the end of the piston 69 passes the end of the cut-off plate 60' said plate will drop, so as to cause its end to bear against the opposite edge of the piston 69. The moment said plate 60' descends, as just described, the exhaust-valve 42' is, of course, again turned so as to bring its opening into register with the branch port 40', so as to allow the steam in the space between the two cut-off plates to exhaust. At this time the shaft 18 has revolved far enough to cause the oscillating shaft 54, through the intermeshing gears 31 and 32 and other parts, to be moved toward the left of Fig. 1. This will cause a pull on crank-arm 49', whereby the inlet-valve 41' is opened, and a push on crank-arm 49, whereby the inlet-valve 41 is closed. The parts are now in the position illustrated in Fig. 5, when the same operation described is repeated.

My improved engine possesses the advantage of being much more simple than the ordinary form, involving fewer parts, and hence greatly cheapening the cost of construction. Besides, a greatly-increased power is obtainable over engines employing the reciprocating pistons, with a much less quantity of fuel being required.

While I have described steam as the motive power of the engine, it is obvious that compressed air, gas, water, or any other suitable motive agent may be employed.

Having thus described my invention, what I claim, and desire to secure by Letters Patent, is—

1. In an engine, the combination, of a casing provided with a chamber, said casing having inlet and exhaust ports in communication with the chamber, valves within said ports for regulating the passage of the motive agent to the chamber, a shaft, a piston mounted on said shaft and located within the chamber, cut-off plates bearing against opposite edges of the piston, means for operating the exhaust-valves, whereby the respective exhaust-ports are closed before the ends of the piston pass the same, and are opened after the ends of the piston pass the same, and means for operating the inlet-valves, whereby, when the end of the piston registers with one inlet-port, said port is opened and the other inlet-port simultaneously closed, and, when the opposite end of the piston, registers with said latter inlet-port the same is opened, and the first-named inlet-port simultaneously closed, substantially as described.

2. In an engine, the combination, of a casing provided with a chamber, said casing having inlet and exhaust ports in communication with the chamber, valves within said ports for regulating the passage of the motive agent to the chamber, a shaft, a piston mounted upon the shaft and located within the chamber, said piston having opposite cam edges, cut-off plates bearing against the opposite cam edges of the piston, and adapted to be raised and lowered as the piston revolves, connections between said cut-off plates and the exhaust-valves, whereby, through the raising of the cut-off plates by the cam edges, the exhaust-valves are operated, and the respective exhaust-ports closed before the ends of the piston pass the same, and, through the lowering of the cut-off plates by the cam edges, said exhaust-valves are operated in the reverse direction, and the respective exhaust-ports opened, after the ends of the piston pass the same, and means for operating the inlet-valves, whereby, when the end of the piston registers with one inlet-port, said port is opened, and the other inlet-port simultaneously closed, and, when the opposite end of the piston registers with said latter inlet-port the same is opened, and the first-named inlet-port simultaneously closed, substantially as described.

3. In an engine, the combination, of a casing provided with a chamber, said casing having inlet and exhaust ports in communication with the chamber, valves within said ports for regulating the passage of the motive agent to the chamber, a shaft, a piston mounted upon the shaft and located within the chamber, said piston having opposite cam edges, cut-off plates bearing against the opposite cam edges of the piston, and provided with projecting rods having rigid collars thereon, spring-actuated rods having arms at their upper ends through which the projecting rods of the cut-off plates pass freely, cranks secured to the valve-stems of the exhaust-valves, and connected at their opposite ends to the ends of the spring-actuated rods, and means for operating the inlet-valves, whereby, when the end of the piston registers with one inlet-port, said port is opened, and the other inlet-port simultaneously closed, and, when the opposite end of the piston registers with said latter inlet-port, the same is opened, and the first-named inlet-port simultaneously closed, substantially as described.

4. In an engine, the combination, of a casing provided with a chamber, said casing having inlet and exhaust ports in communication with the chamber, valves within said ports for regulating the passage of the motive agent to the chamber, a shaft, a piston mounted upon the shaft and located within the chamber, said piston having opposite cam edges, steam-cylinders, cut-off plates bearing against the opposite cam edges of the piston, and provided with projecting stems extending through the steam-cylinders, and carrying within the cylinders pistons, and outside of the cylinders rigid collars, spring-actuated rods having arms at their upper ends through which the projecting stems of the cut-off plates pass freely, cranks secured to the valve-stems of the exhaust-valves, and connected at their opposite ends to the ends of the spring-actuated rods, and means for operating the inlet-valves, whereby, when the end of the piston registers with one of the inlet-ports, said port is opened, and the other inlet-port simultaneously closed, and when the opposite end of the piston registers with said latter inlet-port the same is opened, and the first-named inlet-port simultaneously closed, substantially as described.

5. In an engine, the combination, of a casing provided with a chamber, said casing having inlet and exhaust ports in communication with the chamber, valves within said ports for regulating passage of the motive agent to the chamber, a shaft having a gear-wheel mounted thereon, a piston on the shaft and located within the chamber, cut-off plates bearing against opposite edges of the piston, means for operating the exhaust-valves, whereby the respective exhaust-ports are closed before the ends of the piston pass the same, and are opened after the ends of the piston pass the same, a pinion mounted on the counter-shaft and meshing with the large gear of the main shaft, said pinion provided with a crank or wrist, an arm provided with an elongated slot in which the crank or wrist works, a shaft to which the vertically-slotted arm is secured, and cranks secured to the ends of the stems of the inlet-valves and to the ends of the shaft, substantially as described.

In testimony whereof I affix my signature in presence of two witnesses.

ERNST ORTMANN.

Witnesses:
ARTHUR L. MORSELL,
ANNA V. FAUST.